(12) United States Patent
Takada et al.

(10) Patent No.: US 12,445,607 B2
(45) Date of Patent: Oct. 14, 2025

(54) VIDEO CODING APPARATUS AND VIDEO DECODING APPARATUS

(71) Applicant: Sharp Kabushiki Kaisha, Sakai (JP)

(72) Inventors: Keiichiro Takada, Sakai (JP); Yukinobu Yasugi, Sakai (JP); Tomohiro Ikai, Sakai (JP); Tomoko Aono, Sakai (JP); Takeshi Chujoh, Sakai (JP); Tomonori Hashimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/693,565

(22) PCT Filed: Sep. 7, 2022

(86) PCT No.: PCT/JP2022/033488
§ 371 (c)(1),
(2) Date: Mar. 20, 2024

(87) PCT Pub. No.: WO2023/047950
PCT Pub. Date: Mar. 30, 2023

(65) Prior Publication Data
US 2024/0397042 A1 Nov. 28, 2024

(30) Foreign Application Priority Data
Sep. 22, 2021 (JP) .................. 2021-153957

(51) Int. Cl.
*H04N 19/33* (2014.01)
*H04N 19/117* (2014.01)
*H04N 19/169* (2014.01)
*H04N 19/176* (2014.01)
*H04N 19/80* (2014.01)

(52) U.S. Cl.
CPC ......... *H04N 19/117* (2014.11); *H04N 19/176* (2014.11); *H04N 19/1883* (2014.11); *H04N 19/80* (2014.11)

(58) Field of Classification Search
CPC ............... H04N 19/117; H04N 19/176; H04N 19/1883; H04N 19/80; H04N 19/70; H04N 19/86; H04N 19/82
See application file for complete search history.

(56) References Cited

U.S. PATENT DOCUMENTS

2022/0256227 A1* 8/2022 Rezazadegan Tavakoli ................ A61B 5/4839
2023/0328292 A1* 10/2023 Chujoh .................. H04N 19/80 375/240.26
2023/0421785 A1* 12/2023 Chujoh ................ H04N 19/182

OTHER PUBLICATIONS

Wang, Hongtao et al. AHG11: Neural Network-based In-Loop Filter Performance with No Deblocking Filtering stage. Joint Video Experts Team (JVET) of ITU-T SG 16 WP 3 and ISO/ IEC JTC 1/SC 29 21st Meeting. by teleconference. Jan. 6-15, 2021, [JVET-U0115-v2], JVET-U0115 (version 2), ITU-T, (Year: 2021).*

(Continued)

*Primary Examiner* — Howard D Brown, Jr.
(74) *Attorney, Agent, or Firm* — Keating & Bennett, LLP

(57) ABSTRACT

In a case that a scaling value of neural network filter strength is set equal to 0, a decoded image before a deblocking filter is output, and thus block noise occurs. In a case that luma and chroma parameters are not taken into consideration, processing for an image of multiple transfer functions and chroma parameters is not appropriately performed. In a unit of a prescribed block, by using a parameter indicating a degree of application of the NN filter, an image after the deblocking filter and an image after an NN filter are combined using a different ratio of the images. Filter processing of a luma image is switched based on a luma parameter, and (Continued)

filter processing of a chroma image is switched based on a chroma parameter.

3 Claims, 14 Drawing Sheets

(56) References Cited

OTHER PUBLICATIONS

Official Communication issued in International Patent Application No. PCT/JP2022/033488, mailed on Nov. 29, 2022.
International Telecommunication Union, "Series H: Audiovisual and Multimedia Systems Infrastructure of audiovisual services—Coding of moving video, Versatile video coding", ITU-T H.266, Aug. 2020, 516 pages.
Wang et al., "AHG11: Neural Network-based In-Loop Filter Performance with No Deblocking Filtering stage", Joint Video Experts Team (JVET) of ITU-T SG 16 WP 3 and ISO/IEC JTC 1/SC 29, JVET-U0115-v2, Jan. 6-15, 2021, pp. 1-5.
Wang et al., "EE1-related: Neural Network-based in-loop filter with constrained computational complexity", Joint Video Experts Team (JVET) of ITU-T SG 16 WP 3 and ISO/IEC JTC 1/SC 29, JVET-W0131-v2, Jul. 7-16, 2021, pp. 1-5.
Kidani et al., "CE10-1.10/CE10-1.11: Evaluation results of CNN-based filtering with on-line learning model", Joint Video Experts Team (JVET) of ITU-T SG 16 WP 3 and ISO/IEC JTC 1/SC 29/WG 11, JVET-O0131, Jul. 3-12, 2019, 4 Pages.

\* cited by examiner (a) LOOP FILTER (b) PREDICTION IMAGE FILTER (c) POST-FILTER

# VIDEO CODING APPARATUS AND VIDEO DECODING APPARATUS

TECHNICAL FIELD

Embodiments of the present invention relate to a video coding apparatus and a video decoding apparatus. This application claims priority based on JP 2021-153957 filed on Sep. 22, 2021, the contents of which are incorporated herein by reference.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and an H.265/High-Efficiency Video Coding (HEVC) scheme, and the like.

In such a video coding scheme, images (pictures) constituting a video are managed in a hierarchical structure including slices obtained by splitting an image, Coding Tree Units (CTUs) obtained by splitting a slice, units of coding (which may also be referred to as Coding Units (CUs)) obtained by splitting a coding tree unit, and Transform Units (TUs) obtained by splitting a coding unit, and are coded/decoded for each CU.

In such a video coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

In addition, the recent technology for video coding and decoding includes NPL 1.

NPL 1 defines a technique of a deblocking filter being filter processing applied to a reconstructed image in order to reduce block boundary distortion.

NPL 2 discloses a method of applying a neural network filter by skipping a deblocking filter, and thereby controlling strength of the neural network filter using a scaling value.

CITATION LIST

Non Patent Literature

NPL 1: ITU-T Recommendation H.266 (08/20) 2020 Aug. 29
NPL 2: H. Wang, J. Chen, K. Reuze, "A. M. Kotra and M. Karczewicz, EE1-related: Neural Network-based in-loop filter with constrained computational complexity," JVET-W0131, July. 2021.

SUMMARY OF INVENTION

Technical Problem

In NPL 1, there is a problem in that, in a case that the deblocking filter is applied using a bS value indicating strength of the deblocking filter, an image is smoothed and edge information is thus lost.

NPL 2 discloses the neural network filter having an effect of the deblocking filter with use of the bS value indicating strength of block noise of NPL 1. However, there is a problem in that, in a case that the scaling value of the neural network filter strength is set equal to 0, a decoded image before the deblocking filter is output and the block noise becomes visible. Properties of an image vary depending on transfer functions and color spaces, and processing for an image of such multiple transfer functions and color spaces is not appropriately performed.

Solution to Problem

A video decoding apparatus according to an aspect of the present invention includes a parameter decoder for decoding a filter parameter, a bS derivation unit for deriving deblocking filter strength bS, a DF unit for performing deblocking filter, an NN filter unit for performing filter processing using a neural network, and an image combining unit. The parameter decoder decodes an nn_area_weight parameter indicating a degree of application of an NN filter in a unit of a prescribed block. The NN unit outputs a first image from an image before processing of the DF unit. The DF unit outputs a second image from an image before processing of the NN filter unit. The image combining unit derives an output image from the first image, the second image, and the nn_area_weight.

A parameter decoder configured to decode a luma parameter related to a transfer function, and an NN filter unit configured to perform filter processing using a neural network are included. The NN filter unit includes a luminance NN filter unit configured to filter a luma image, and a chrominance NN filter unit configured to filter a chroma image. The luminance NN filter unit switches the filter processing, based on the luma parameter.

Furthermore, a parameter decoder configured to decode a chroma parameter related to a color space, and an NN filter unit configured to perform filter processing using a neural network are included. The NN filter unit includes a luminance NN filter unit configured to filter a luma image, and a chrominance NN filter unit configured to filter a chroma image. The chrominance NN filter unit switches the filter processing, based on the chroma parameter.

Advantageous Effects of Invention

By employing the configuration described above, an effect of reducing block noise of a decoded image can be achieved regardless of strength of a neural network filter. An effect can be achieved that preferable processing is performed on an image of multiple transfer functions and chroma parameters.

DESCRIPTION OF EMBODIMENTS

First Embodiment

Hereinafter, an embodiment of the present invention will be described with reference to the drawings.

Figure 1:
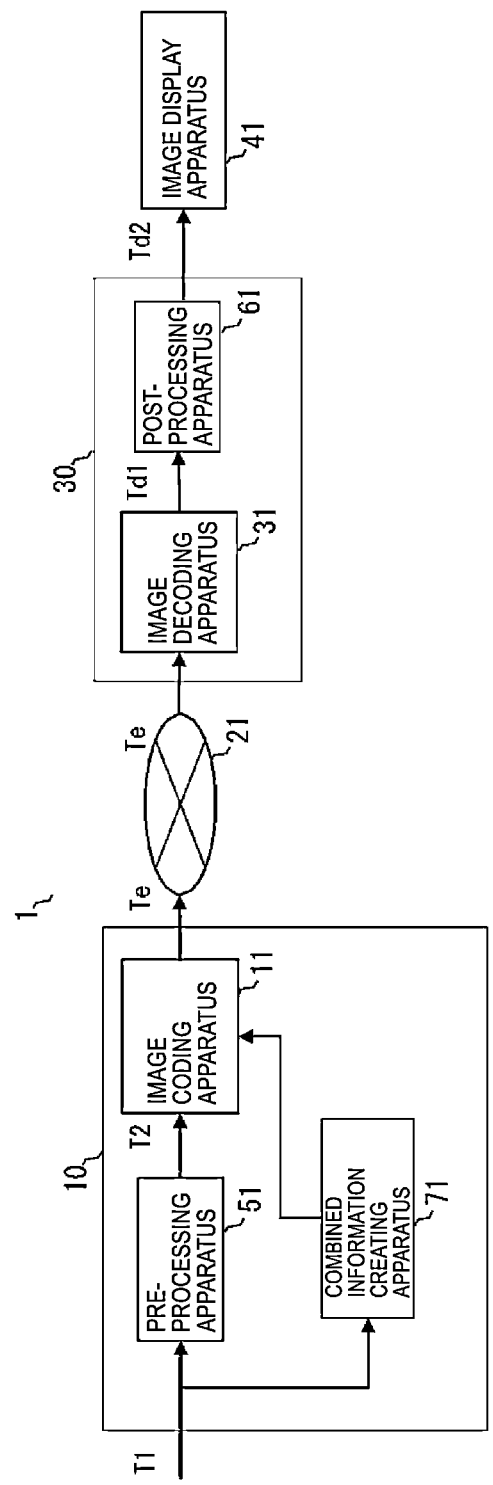
FIG. 1 is a schematic diagram illustrating a configuration of a video transmission system according to the present embodiment.

FIG. 1 is a schematic diagram illustrating a configuration of a video transmission system according to the present embodiment.

The video transmission system 1 is a system for transmitting coded data in which an image of different resolution converted in resolution is coded, decoding the coded data transmitted, and inversely transforming the coded data decoded into the image with the original resolution for display. The video transmission system 1 includes a video coding apparatus 10, a network 21, a video decoding apparatus 30, and an image display apparatus 41.

The video coding apparatus 10 includes a pre-processing apparatus (pre-processing unit) 51, an image coding apparatus (image coder) 11, and a combined information creating apparatus (combined information creating unit) 71.

The video decoding apparatus 30 includes an image decoding apparatus (image decoder) 31 and a post-processing apparatus (post-processing unit) 61.

The pre-processing apparatus 51 converts the resolution of an image T included in a video as necessary, and supplies a variable resolution video T2 including the image with a different resolution to the image coding apparatus 11. The pre-processing apparatus 51 may supply, to the image coding apparatus 11, filter information indicating the presence or absence of resolution conversion of the image.

The combined information creating apparatus 71 creates the filter information based on an image T1 included in the video, and transmits the resultant to the image coding apparatus 11. The variable resolution image T2 is input to the image coding apparatus 11. With use of a framework of RPR, the image coding apparatus 11 codes image size information of an input image for each PPS, and transmits the coded image size information to the image decoding apparatus 31.

The network 21 transmits the coded filter information and the coded data Te to the image decoding apparatus 31. A part or all of the coded filter information may be included in the coded data Te as supplemental enhancement information SEI. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting of the like. The network 21 may be substituted by a storage medium in which the coded data Te is recorded, such as a Digital Versatile Disc (DVD) (trade name) or a Blu-ray Disc (BD) (trade name).

The image decoding apparatus 31 decodes each of the coded data Te transmitted by the network 21 and generates and supplies a variable resolution decoded image to the post-processing apparatus 61.

In a case that the filter information indicates resolution conversion, the post-processing apparatus 61 performs super-resolution processing using a model parameter for super-resolution, based on the image size information included in the coded data. By inversely transforming the image that has been subjected to resolution conversion, a decoded image of an original size is generated. In a case that the filter information does not indicate resolution conversion, image reconstruction processing using a model parameter for image reconstruction is performed. By performing the image reconstruction processing, a decoded image with reduced coding noise is generated.

The image display apparatus 41 displays all or part of one or multiple decoded images Td2 input from the post-processing apparatus 61. For example, the image display apparatus 41 includes a display device such as a liquid crystal display and an organic Electro-luminescence (EL) display. Forms of the display include a stationary type, a mobile type, an HMD type, and the like. In a case that the image decoding apparatus 31 has a high processing capability, an image having high image quality is displayed, and in a case that the apparatus has a lower processing capability, an image which does not require high processing capability and display capability is displayed.

Operator

Operators used in the present specification will be described below.

$>>$ is a right bit shift, $<<$ is a left bit shift, & is a bitwise AND, | is a bitwise OR, |= is an OR assignment operator, and || indicates a logical sum.

x?y:z is a ternary operator that takes y in a case that x is true (other than 0) and takes z in a case that x is false (0).

Clip3(a, b, c) is a function to clip c in a value of a to b, and a function to return a in a case that c is smaller than a (c<a), return b in a case that c is greater than b (c>b), and return c in the other cases (provided that a is smaller than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

a^b represents the b-th power of a. In a case that a=2 and b is an integer, $2^b=1<<b$.

array[x] represents a value of an array array[x] at a position x.

Structure of Coded Data Te

Prior to the detailed description of the image coding apparatus 11 and the image decoding apparatus 31 according to the present embodiment, a data structure of the coded data Te generated by the image coding apparatus 11 and decoded by the image decoding apparatus 31 will be described.

Figure 2:
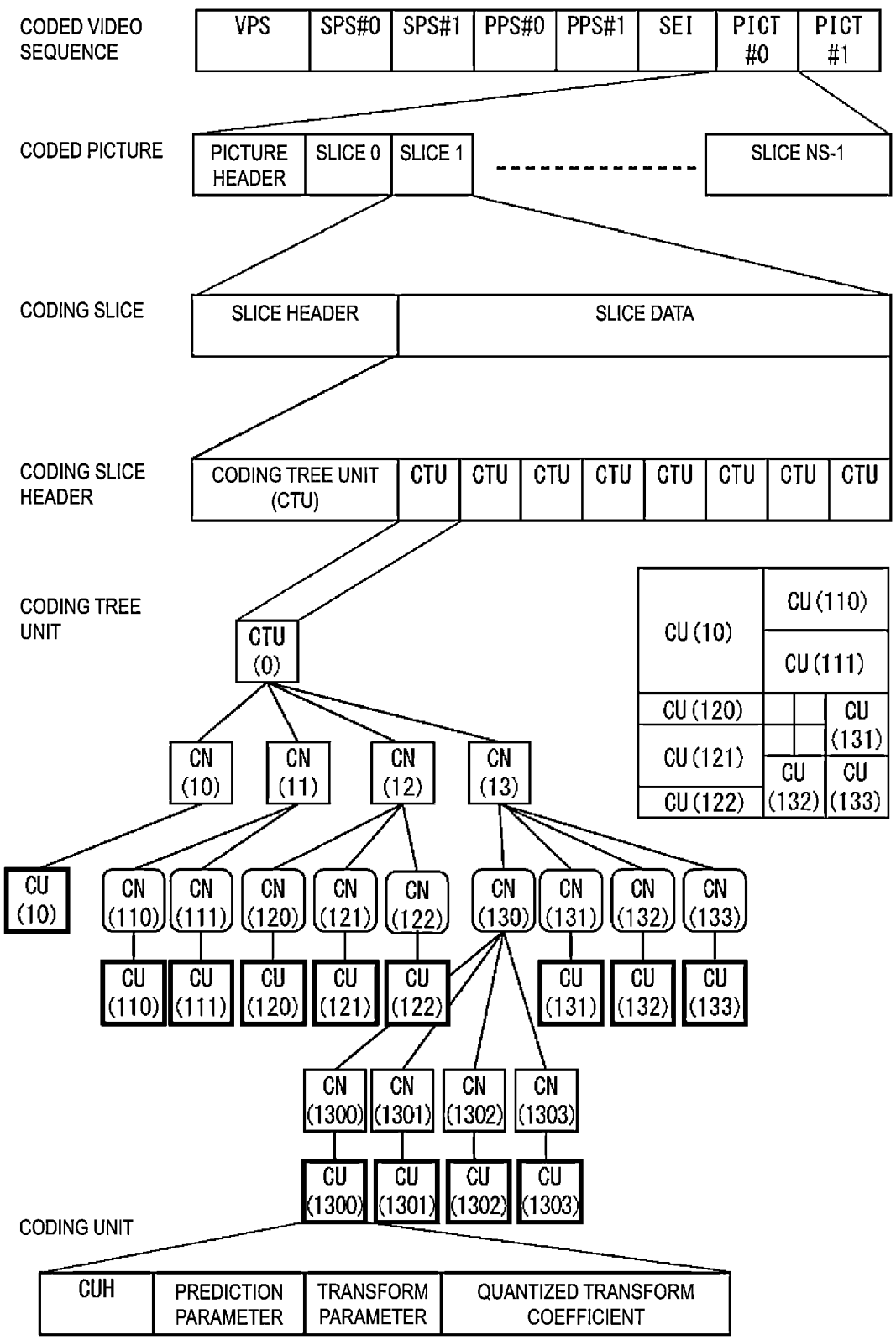
FIG. 2 is a diagram illustrating a hierarchical structure of coded data.

FIG. 2 is a diagram illustrating a hierarchical structure of data of the coded data Te. The coded data Te includes a sequence and multiple pictures constituting the sequence illustratively. FIG. 2 is a diagram illustrating a coded video sequence prescribing a sequence SEQ, a coded picture defining a picture PICT, a coding slice defining a slice S, coding slice data defining slice data, a coding tree unit included in the coding slice data, and a coding unit included in the coding tree unit.

Coded Video Sequence

In the coded video sequence, a set of data referred to by the image decoding apparatus 31 to decode the sequence SEQ to be processed is defined. As illustrated in FIG. 2, the sequence SEQ includes a Video Parameter Set VPS, a Sequence Parameter Set SPS, a Picture Parameter Set PPS, an Adaptation Parameter Set (APS), a picture PICT, and Supplemental Enhancement Information SEI.

In the video parameter set VPS, in a video including multiple layers, a set of coding parameters common to multiple videos and a set of coding parameters associated with the multiple layers and an individual layer included in the video are defined.

In the sequence parameter set SPS, a set of coding parameters referred to by the image decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referred to by the image decoding apparatus 31 to decode each picture in a target sequence is defined. Note that multiple PPSs may exist. In that case, any of the multiple PPSs is selected from each picture in a target sequence.

Coded Picture

In the coded picture, a set of data referred to by the image decoding apparatus 31 to decode the picture PICT to be processed is defined. As illustrated in FIG. 2, the picture PICT includes a picture header PH and slices 0 to NS−1 (NS is the total number of slices included in the picture PICT).

In the description below, in a case that the slices 0 to NS−1 need not be distinguished from one another, subscripts of reference signs may be omitted. The same applies to other data with suffixes included in the coded data Te which will be described below.

Coding Slice

In the coding slice, a set of data referred to by the image decoding apparatus 31 to decode the slice S to be processed is defined. The slice includes a slice header and slice data as illustrated in FIG. 2.

The slice header includes a coding parameter group referenced by the image decoding apparatus 31 to determine a decoding method for a target slice. Slice type indication information (slice_type) indicating a slice type is one example of a coding parameter included in the slice header.

Examples of slice types that can be indicated by the slice type indication information include (1) I slices for which only an intra prediction is used in coding, (2) P slices for which a uni-prediction (L0 prediction) or an intra prediction is used in coding, and (3) B slices for which a uni-prediction (L0 prediction or L1 prediction), a bi-prediction, or an intra prediction is used in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the image decoding apparatus 31 to decode the slice data to be processed is defined. Slice data includes CTUs as illustrated in a coding slice header of FIG. 2. The CTU is a block of a fixed size (for example, 64×64) constituting a slice, and may also be called a Largest Coding Unit (LCU).

Coding Tree Unit

In FIG. 2, a set of data is defined that is referenced by the image decoding apparatus 31 to decode the CTU to be processed. The CTU is split into coding units CUs, each of which is a basic unit of coding processing, by a recursive Quad Tree split (QT split), Binary Tree split (BT split), or Ternary Tree split (TT split). The BT split and the TT split are collectively referred to as Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Coding Unit

In FIG. 2, a set of data referenced by the image decoding apparatus 31 to decode the coding unit to be processed is defined. Specifically, the CU includes a CU header CUH, a prediction parameter, a transform parameter, a quantized transform coefficient, and the like. In the CU header, a prediction mode and the like are defined.

There are cases that the prediction processing is performed in units of CU or performed in units of sub-CU in which the CU is further split. In a case that the sizes of a CU and a sub-CU are equal to each other, the number of sub-CUs in the CU is one. In a case that a CU is larger in size than a sub-CU, the CU is split into sub-CUs. For example, in a case that a CU has a size of 8×8, and a sub-CU has a size of 4×4, the CU is split into four sub-CUs which include two horizontal splits and two vertical splits.

There are two types of predictions (prediction modes), which are intra prediction and inter prediction. The intra prediction refers to a prediction in an identical picture, and the inter prediction refers to prediction processing performed between different pictures (for example, between pictures of different display times, and between pictures of different layer images).

Transform and quantization processing is performed in units of CU, but the quantized transform coefficient may be subjected to entropy coding in units of subblock such as 4×4.

Prediction Parameters

A prediction image is derived by prediction parameters associated with blocks. The prediction parameters include intra-prediction and inter-prediction parameters.

Motion Vector mvLX indicates a shift amount between blocks in two different pictures. A prediction vector and a difference vector related to mvLX are referred to as mvpLX and mvdLX, respectively.

Configuration of Image Decoding Apparatus

Figure 3:
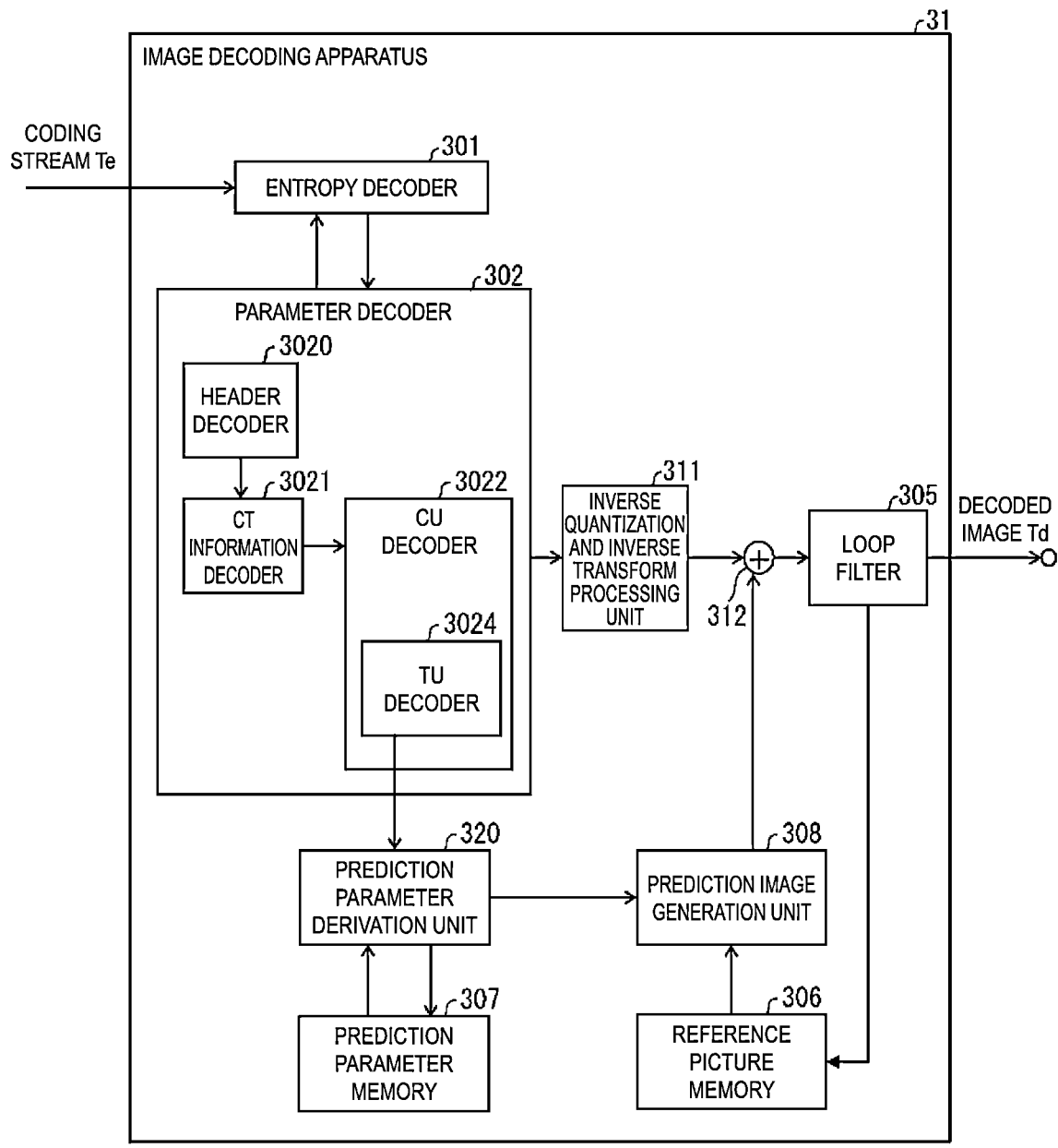
FIG. 3 is a schematic diagram illustrating a configuration of an image decoding apparatus.

A configuration of the image decoding apparatus 31 (FIG. 3) according to the present embodiment will be described.

The image decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311, an addition unit 312, and a prediction parameter derivation unit 320. Note that a configuration in which the loop filter 305 is not included in the image decoding apparatus 31 may be used in accordance with the image coding apparatus 11 described later.

The parameter decoder 302 further includes a header decoder 3020, a CT information decoder 3021, and a CU decoder 3022 (prediction mode decoder), and the CU decoder 3022 further includes a TU decoder 3024. These may be collectively referred to as a decoding module. The header decoder 3020 decodes, from coded data, parameter set information such as the VPS, the SPS, the PPS, and an APS, and a slice header (slice information). The CT information decoder 3021 decodes a CT from coded data. The CU decoder 3022 decodes a CU from coded data. In a case that a TU includes a prediction error, the TU decoder 3024 decodes QP update information (quantization correction value) and a quantization prediction error (residual_coding) from coded data.

The TU decoder 3024 decodes QP update information and a quantization prediction error from the coded data.

The prediction image generation unit 308 includes an inter prediction image generation unit and an intra prediction image generation unit.

In addition, an example in which CTUs and CUs are used as processing unit will be described below, but the processing is not limited to this example, and processing in units of sub-CUs may be performed. Alternatively, the CTUs and the CUs may be replaced with blocks, the sub-CUs may be replaced with by subblocks, and processing may be performed in units of blocks or subblocks.

The entropy decoder 301 performs entropy decoding on the coded data Te input from the outside and separates and decodes individual codes (syntax elements). The entropy decoder 301 outputs the decoded codes to the parameter decoder 302. Which code is to be decoded is controlled based on an indication of the parameter decoder 302.

The prediction parameter derivation unit 320 derives a prediction parameter with reference to the prediction parameters stored in the prediction parameter memory 307 based on the syntax element input from the parameter decoder 302. The prediction parameter is output to the prediction image generation unit 308 and the prediction parameter memory 307.

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) to a decoded image of a CU generated by the addition unit 312.

The reference picture memory 306 stores a decoded image of the CU in a predefined position for each target picture and target CU.

The prediction parameter memory 307 stores the prediction parameter in a predefined position for each CTU or CU. Specifically, the prediction parameter memory 307 stores the parameter decoded by the parameter decoder 302, the parameter derived by the prediction parameter derivation unit 320, and the like.

Parameters derived by the prediction parameter derivation unit 320 are input to the prediction image generation unit 308. In addition, the prediction image generation unit 308 reads a reference picture from the reference picture memory 306. The prediction image generation unit 308 generates a prediction image of a block or a subblock by using the parameters and the reference picture (reference picture block) in the prediction mode indicated by predMode. Here, the reference picture block refers to a set of pixels (referred to as a block because they are normally rectangular) on a reference picture and is a region that is referenced for generating a prediction image.

The inverse quantization and inverse transform processing unit 311 performs inverse quantization on a quantized transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

The inverse quantization and inverse transform processing unit 311 performs inverse quantization on a quantized transform coefficient input from the parameter decoder 302 to calculate a transform coefficient.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Basic Flow

Figure 4:
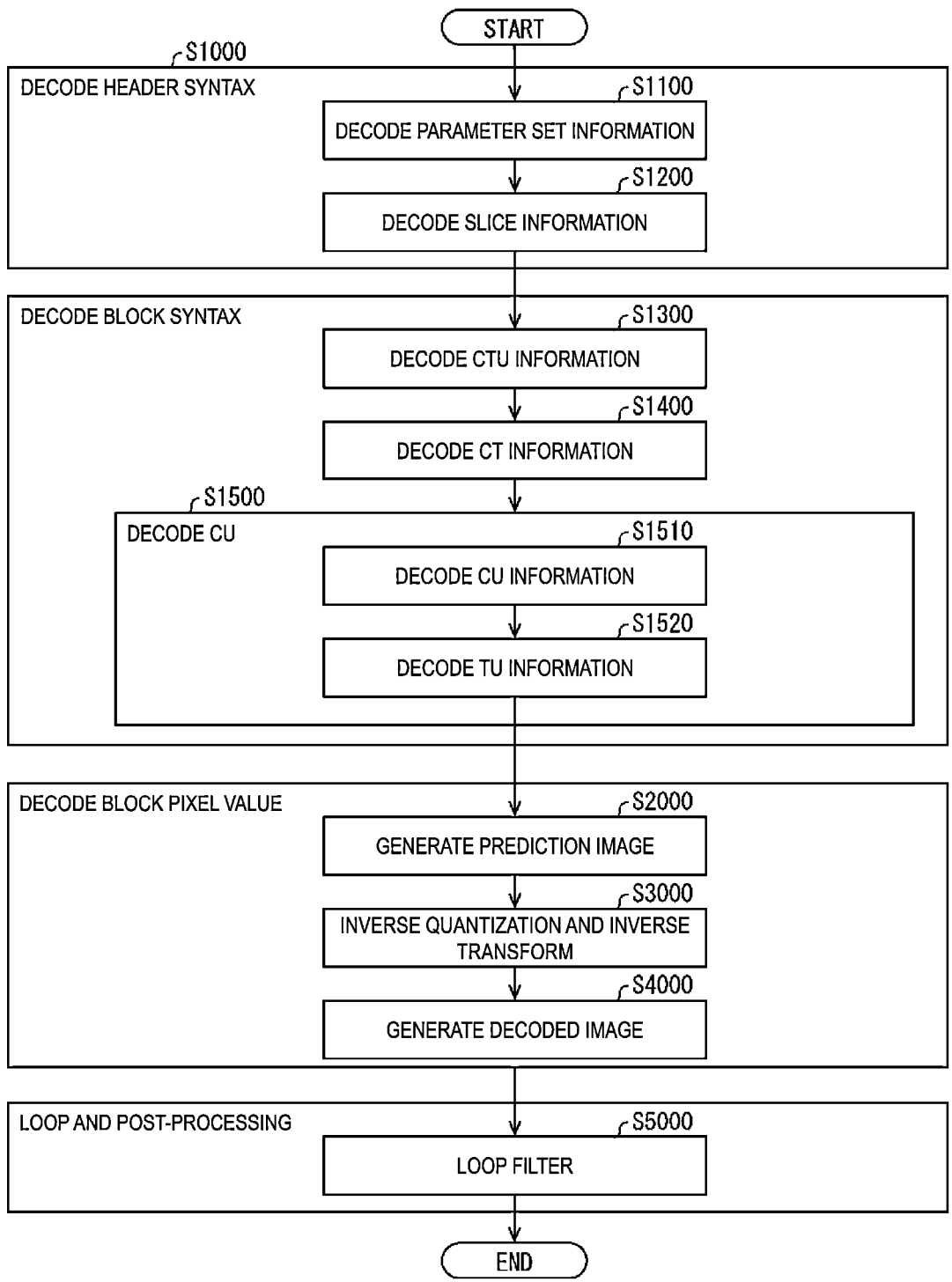
FIG. 4 is a flowchart illustrating general operation of the image decoding apparatus.

FIG. 4 is a flowchart illustrating general operation of the image decoding apparatus 31.

(S1100: Decoding of parameter set information) The header decoder 3020 decodes parameter set information such as the VPS, the SPS, and the PPS from coded data.

(S1200: Decoding of slice information) The header decoder 3020 decodes a slice header (slice information) from the coded data.

Afterwards, the image decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes CU information, prediction information, a TU split flag, a CU residual flag, and the like from the coded data.

(S1520: Decoding of TU information) In a case that the TU includes a prediction error, the TU decoder 3024 decodes, from the coded data, QP update information and a quantization prediction error. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, an SAO, and an ALF to the decoded image.

Configuration of Image Coding Apparatus

Figure 5:
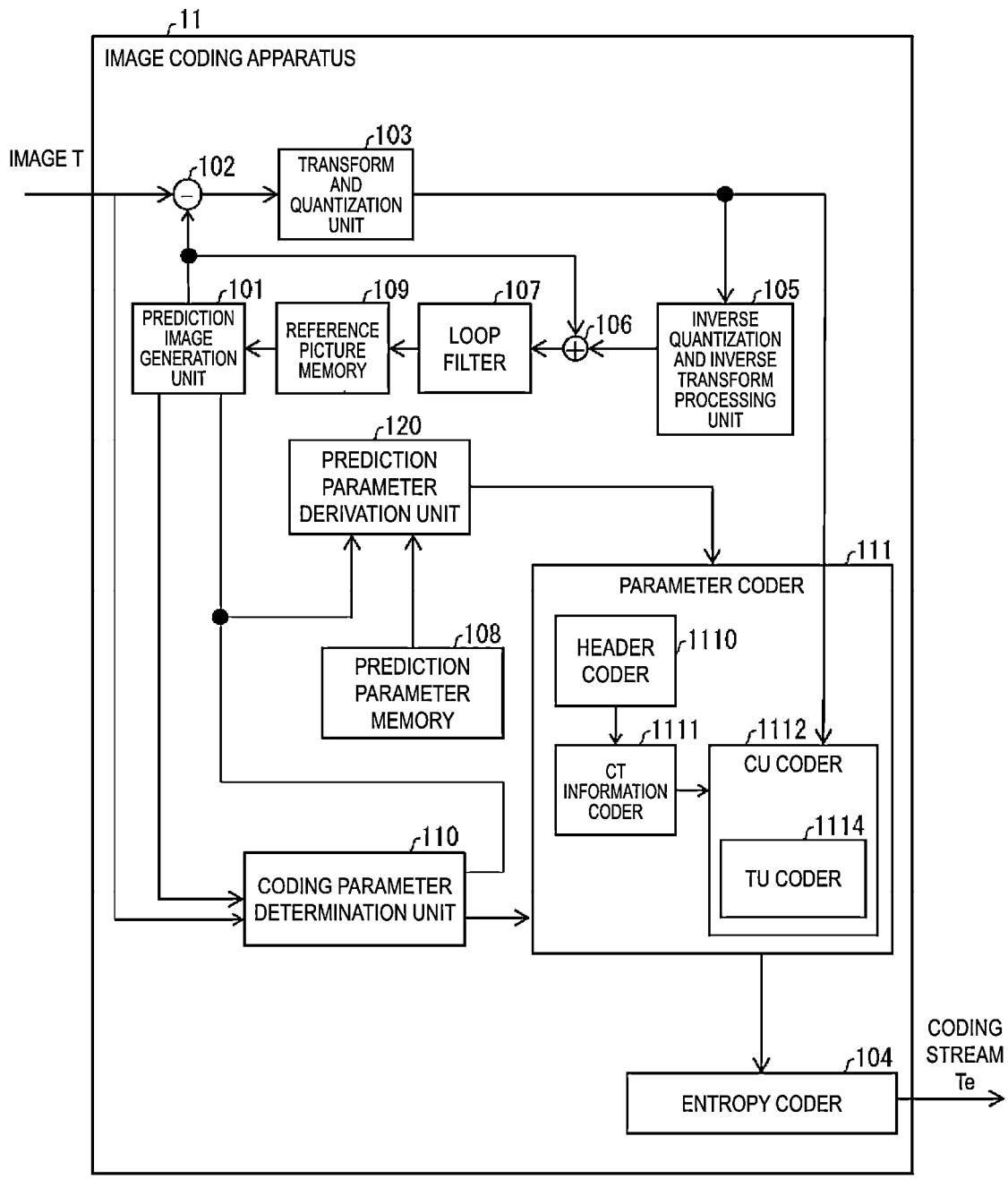
FIG. 5 is a block diagram illustrating a configuration of an image coding apparatus.

Next, a configuration of the image coding apparatus 11 according to the present embodiment will be described. FIG. 5 is a block diagram illustrating a configuration of the image coding apparatus 11 according to the present embodiment. The image coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, a prediction parameter derivation unit 120, and an entropy coder 104.

The prediction image generation unit 101 generates a prediction image for each CU.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the parameter coder 111 and the inverse quantization and inverse transform processing unit 105.

The inverse quantization and inverse transform processing unit 105 is the same as the inverse quantization and inverse transform processing unit 311 (FIG. 3) in the image decoding apparatus 31, and descriptions thereof are omitted. The calculated prediction error is output to the addition unit 106.

The parameter coder 111 includes a header coder 1110, a CT information coder 1111, and a CU coder 1112 (prediction mode coder). The CU coder 1112 further includes a TU coder 1114. General operation of each module will be described below.

The header coder 1110 performs coding processing of parameters such as filter information, header information, split information, prediction information, and quantized transform coefficients.

The CT information coder 1111 codes the QT and MT (BT, TT) split information and the like.

The CU coder 1112 codes the CU information, the prediction information, the split information, and the like.

In a case that a prediction error is included in the TU, the TU coder 1114 codes the QP update information and the quantization prediction error.

The CT information coder 1111 and the CU coder 1112 supply, to the parameter coder 111, syntax elements such as an inter prediction parameter, an intra prediction parameter, and the quantized transform coefficient.

The parameter coder 111 inputs the quantized transform coefficients and the coding parameters (split information and prediction parameters) to the entropy coder 104. The entropy coder 104 entropy-codes these to generate the coded data Te and outputs the coded data Te.

The prediction parameter derivation unit 120 derives the intra prediction parameter and the inter prediction parameter from the parameters input from the coding parameter determination unit 110. The inter prediction parameter and intra prediction parameter derived are output to the parameter coder 111.

The addition unit 106 adds together, for each pixel, a pixel value for the prediction block input from the prediction image generation unit 101 and a prediction error input from the inverse quantization and inverse transform processing unit 105, generating a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameter determination unit 110 outputs the determined coding parameters to the parameter coder 111 and the prediction parameter derivation unit 120.

Configuration Example of NN Filter Unit

Figure 6:
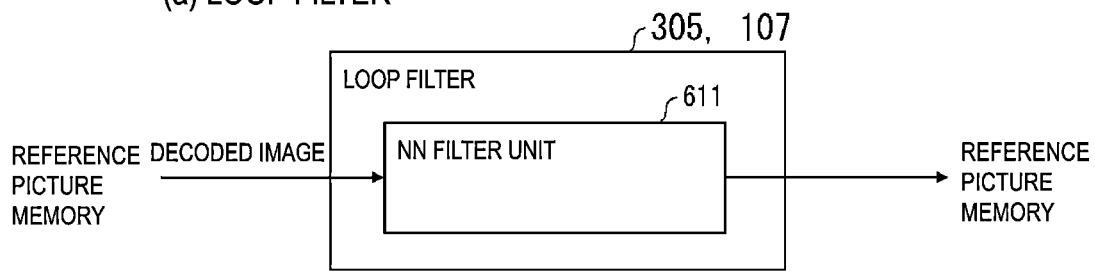
FIG. 6 is a diagram illustrating a configuration of a neural network of an NN filter unit 611.
Figure 6:
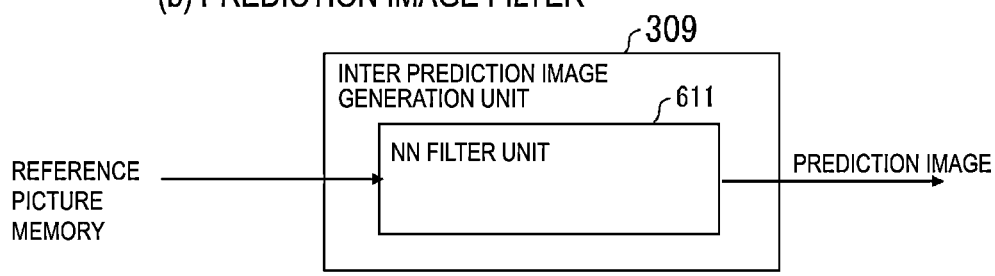
Figure 6:
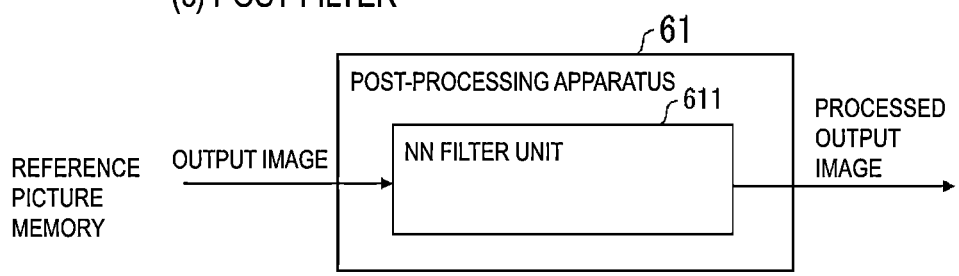

FIG. 6 is a diagram illustrating a configuration of a neural network filter unit (NN filter unit 611). The NN filter unit 611 is a means for performing filter processing by the neural network on the input image, and reduces or enlarges the size to an actual size or to a size of a multiple of a rational number. The NN filter unit may be used for one of a loop filter to be applied to a reference image, prediction image generation processing from the reference image, and a post-filter of an output image.

FIG. 6(a) is a configuration example of the loop filter. The loop filter 305 of the video decoding apparatus (the loop filter 107 of the video coding apparatus) includes the NN filter unit 611. The NN filter unit 611 applies a filter to an image of the reference picture memory 306/106, and stores the resultant in the reference picture memory 306/106. As has been already described, the loop filter may include a DF, an ALF, an SAO, a bilateral filter, or the like.

FIG. 6(b) is a configuration example of the prediction image generation unit. The prediction image generation unit 308 of the video decoding apparatus and the video coding apparatus includes the NN filter unit 611. The NN filter unit 611 reads an image of the reference picture memory 306/106, applies a filter, and generates a prediction image. The prediction image may be used for CIIP prediction, GPM prediction, weighted prediction, and BDOF, or may be directly output to the addition unit 312 (the subtraction unit 102 in the coding apparatus).

FIG. 6(c) is a configuration example of the post-filter. The post-processing unit 61 after the video decoding apparatus includes the NN filter unit 611. In a case of outputting an image of the reference picture memory 306, the NN filter unit 611 performs processing in the NN filter unit 611 and outputs the resultant to the outside. Displaying, file writing, re-encoding (transcoding), transmission, and the like may be performed on the output image.

Switching Between Deblocking Filter and NN Filter

Figure 7:
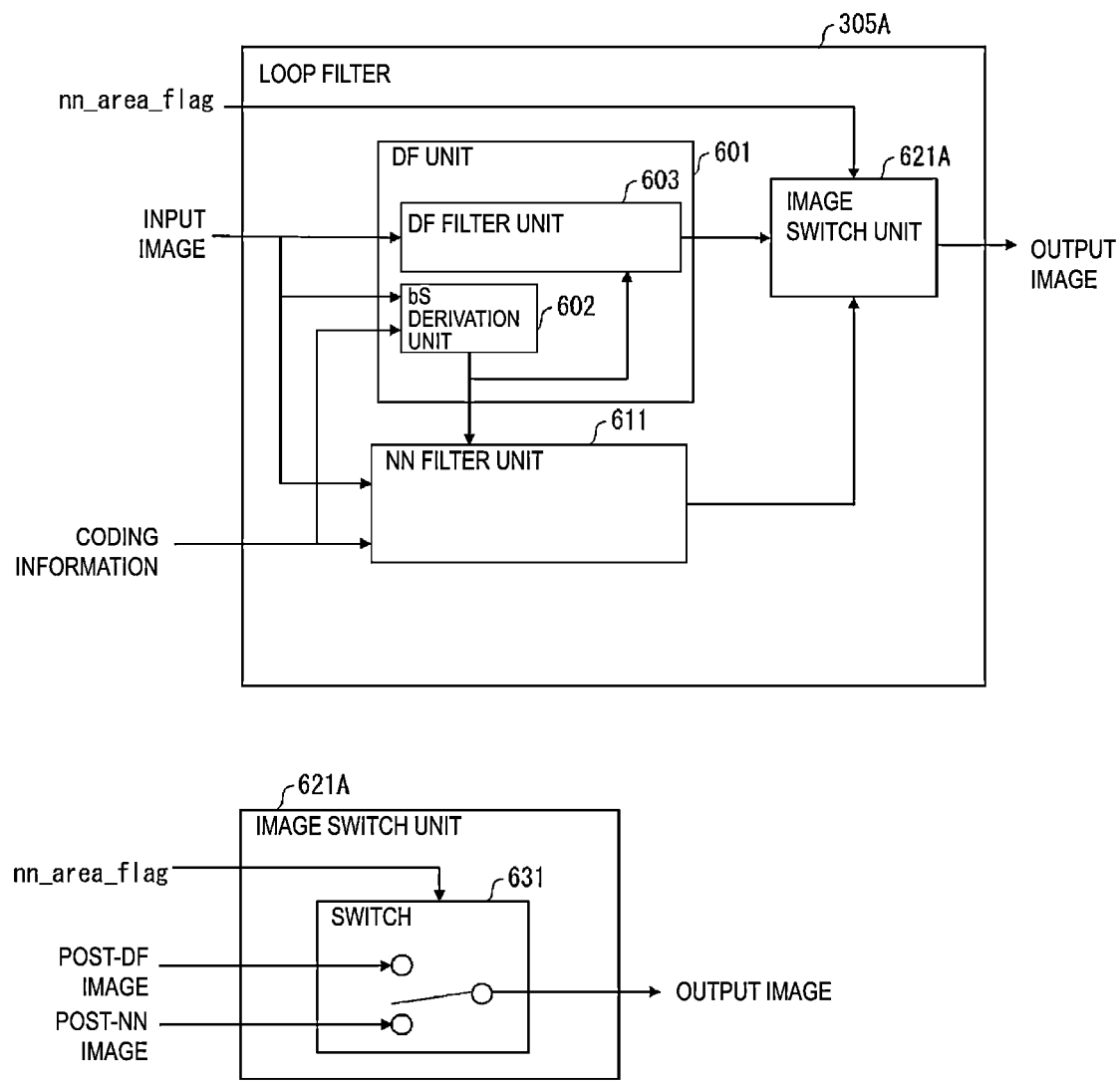
FIG. 7 is a diagram illustrating a configuration of a loop filter 305A in a decoding apparatus.

Application of the NN filter to the loop filter 305 of the video decoding apparatus (the loop filter 107 of the video coding apparatus) will be described. The loop filters including the NN filter are hereinafter denoted by 305A and 107A in contrast to the loop filters 305 and 107 including the deblocking filter. FIG. 7 is a diagram illustrating a configuration of the loop filter 305A. In the present configuration, ON and OFF of the NN filter are switched in a unit of a region (for example, a unit of the CTU, 32×32, 64×64, or the like). The loop filter 305A of the present configuration includes a DF unit 601, the NN filter unit 611, and an image switch unit 621A. The DF unit 601 includes a bS derivation unit 602 that derives strength bS of the deblocking filter in a unit of a pixel, a boundary, and a line segment, and a DF filter unit 603 that performs deblocking filter processing in order to reduce block noise.

nn_area_flag is a binary flag decoded in a prescribed unit in the parameter decoder 302. For example, nn_area_flag may be decoded in the picture header, the slice header, or a tile header, or may be decoded in the CTU. It may be decoded in a unit of a color component. Top left coordinates (xCTU, yCTU) of a region and nn_area_flag [cIdx][xCTU][yCTU] of a color component cIdx are hereinafter simply referred to as nn_area_flag. The color component cIdx takes values of 0, 1, and 2, and the values may respectively indicate Y, Cb, and Cr, or indicate Y, Co, and Cb. G, B, and R or R, G, and B may be indicated.

nn_area_flag is a flag indicating whether the deblocking filter 601 or the NN filter 611 is used as the loop filter. The image switch unit 621A includes a switch 631, and selects and outputs one of an output image of the NN filter 611 and an output image of the DF unit 601. The switch 631 receives nn_area_flag, a DF image, and an NN image. Here, nn_area_flag is a variable having a binary value of 0 or 1. In other words, depending on the value of nn_area_flag, whether the output of the NN filter unit 611 is used as the output image or the output of the DF is used as the output image is switched.

In other words, in a case that nn_area_flag is 1, the loop filter 305A applies the NN filter to the input image, whereas in a case that nn_area_flag is 0, the loop filter 305A applies the deblocking filter to the input image.

The NN filter unit 611 is a neural network, and has an effect of reducing deblocking noise occurring at the block boundary in prediction and transform. The DF filter unit 603 is a filter for performing filter processing depending on a bS value derived in the bS derivation unit 602, and has an effect of reducing the deblocking noise.

Figure 8:
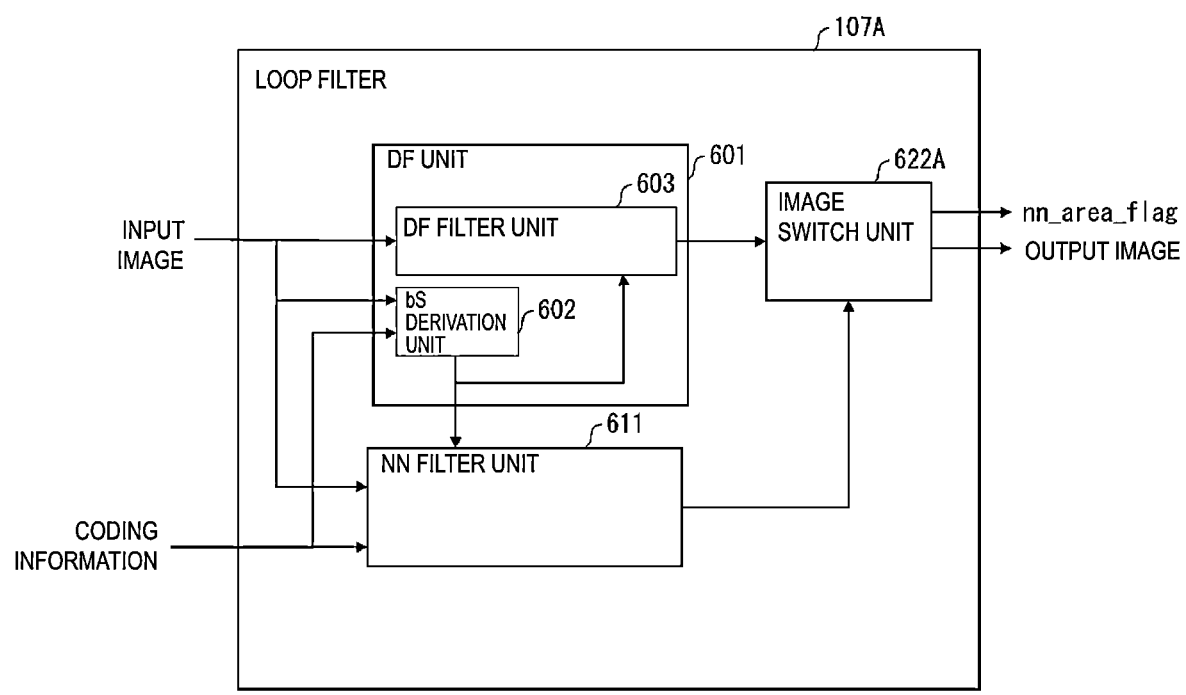
FIG. 8 is a diagram illustrating a configuration of a loop filter 107A in a coding apparatus.

In the loop filter in the image coding apparatus, as illustrated in FIG. 8, in an image switch unit 622A, nn_area_flag is determined, and based on this, one of the output of the DF and the output of the NN filter is selected and is output. The parameter coder 111 codes nn_area_flag in a prescribed unit. Note that the configuration of FIG. 7 may be used, in which nn_area_flag is determined outside a loop filter unit and is input to the loop filter.

According to the configuration described above, even in a case that the output of the NN filter unit is turned off in a unit of a region, by using the output of the DF, there is an effect of reducing the deblocking noise regardless of ON and OFF of the NN filter.

Details of NN Filter Unit 611

The NN filter unit 611 may input an output parameter bS[ ][ ] of the bS derivation unit 602, and perform neural network processing. Furthermore, the output of the bS derivation unit 602 may be used as a channel different from an image in the NN filter unit 611. In other words, the following may be defined in x=xCb . . . xCb+width−1 and y=yCb . . . yCb+height−1 where top left coordinates of a target block are represented by (xCb, yCb), the width thereof is represented by width, and the height thereof is represented by height.

$$inSamples[0][x][y]=recSamples[cIdx][x][y]$$

$$inSamples[1][x][y]=bS[x][y]$$

bS may be used as a part (one channel) of the input image inSamples of the NN filter unit 611, and here, cIdx is a color component index. recSamples[cIdx][x][y] is an image (decoded image, reference image) of the color component cIdx. It may be a luma image of recSamples[0][x][y].

Furthermore, the neural network processing may be performed by inputting a maximum filter length maxFilterLength[ ][ ] and longTapEnables[ ][ ]. maxFilterLength[ ][ ] may be an output of the bS derivation unit 602. longTapEnables[ ][ ] is a parameter indicating whether or not to use a long tap filter. These parameters may be used as a channel different from an image in the NN filter unit 611. For example, the following configuration may be employed.

$$inSamples[0][x][y]=recSamples[cIdx][x][y]$$

$$inSamples[1][x][y]=bS[x][y]$$

$$inSamples[2][x][y]=maxFilterLength[x][y]$$

or $$inSamples[0][x][y]=recSamples[cIdx][x][y]$$

$$inSamples[1][x][y]=bS[x][y]$$

$$inSamples[2][x][y]=longTapEnables[x][y]$$

Adjustment of Degree of Application of NN Filter

Figure 9:
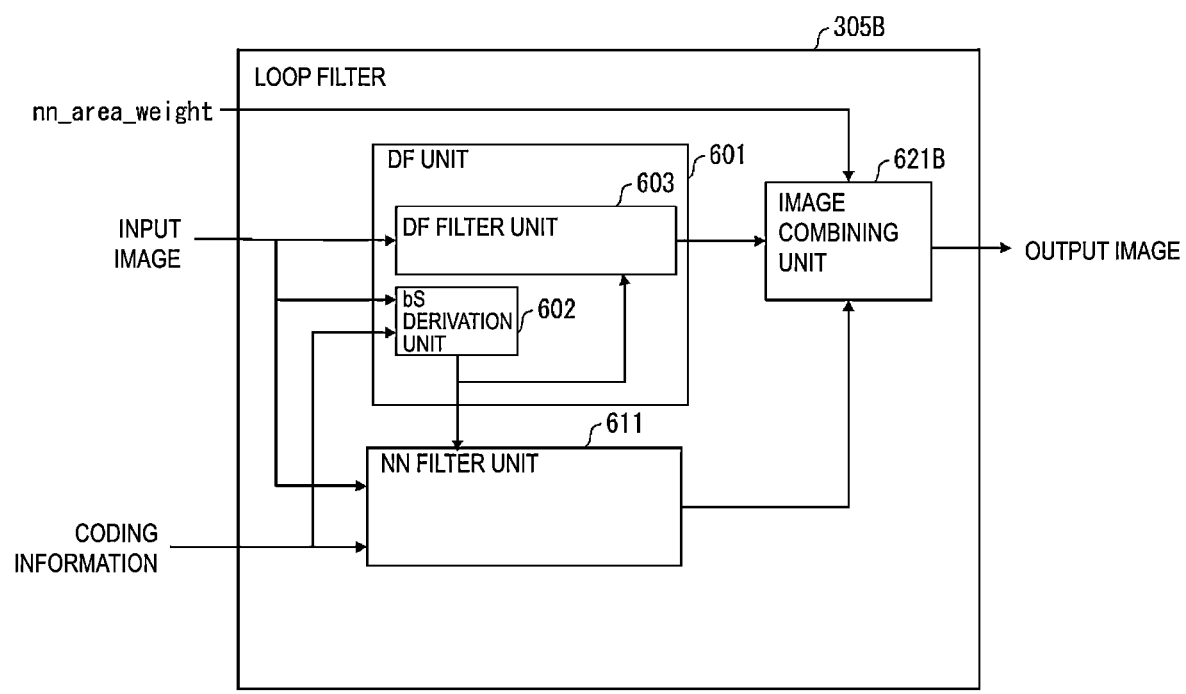
FIG. 9 is a diagram illustrating a configuration of a loop filter 305B in the decoding apparatus.

FIG. 9 is a diagram illustrating a configuration of the loop filter. The loop filter 305B of the present configuration includes the DF unit 601, the NN filter unit 611, and an image combining unit 622B. The DF unit 601 includes the bS derivation unit 602 that derives the strength bS of the deblocking filter, and the DF filter unit 603 that receives an input image and performs the deblocking filter.

nn_area_weight is a parameter having three or more values decoded in a prescribed unit in the parameter decoder 302, and indicates a degree of application of the NN filter. For example, nn_area_weight may be decoded in the picture header, the slice header, or a tile header, or may be decoded in the CTU. It may be decoded in a unit of a color component. Top left coordinates (xCTU, yCTU) of a region and nn_area_weight[cIdx][xCTU][yCTU] of the color component cIdx are hereinafter simply referred to as nn_area_weight. Here, nn_area_weight takes an integer value of 0, 1, (1<<shift).

The image combining unit 621B of the present configuration weights (weighted average) an output image dfSamples[x][y] of the DF unit 601 and an output image nnSamples[x][y] of the NN filter unit 611, and combines the weighted output images to generate an output image of the loop filter.

The image combining unit 621B combines dfSamples and nnSamples, using nn_area_weight as follows.

recSamples[*x*][*y*]=(*nn*_area_weight*dfSamples[*x*][*y*]+
((1<<shift)−*nn*_area_weight)**nn*Samples[*x*][*y*]+
round)>>shift Depending on the value of nn_area_weight, the image combining unit 621B can combine the output of the DF and the output of the NN filter using a different ratio of the outputs. The NN filter 611 and the DF unit 601 have been already described, and thus description thereof will be omitted.

Figure 10:
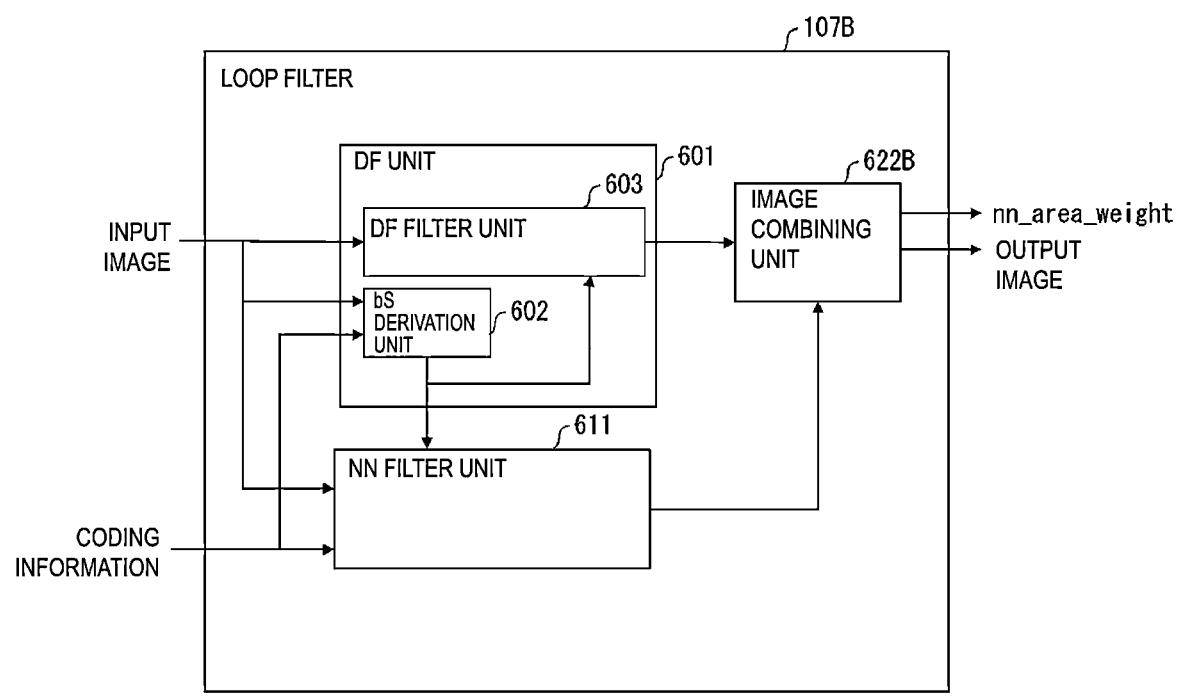
FIG. 10 is a diagram illustrating a configuration of a loop filter 107B in the coding apparatus.

As illustrated in FIG. 10, the loop filter in the coding apparatus determines and outputs nn_area_weight in an image combining unit 622B. nn_area_weight is coded for each prescribed unit in the parameter coder 111.

According to the configuration described above, even in a case that the output of the NN filter unit is adjusted depending on a region, a deblock filter image and an NN filter image are weighted and combined for each region, and there is an effect of reducing the deblocking noise.

bS Derivation Unit 602

The bS derivation unit 602 derives an edge degree edgeIdc indicating whether there is a partition split boundary, a boundary of a prediction block, and a boundary of a transform block in an input image resPicture, and the maximum filter length maxFilterLength of the deblocking filter. Furthermore, the strength bS of the deblocking filter is derived from edgeIdc, the boundary of the transform block, and the coding parameters. For example, the coding parameters are a prediction mode CuPredMode of each CU, a BDPCM prediction mode intra_bdpcm_luma_flag, a flag indicating whether it is an IBC prediction mode, a motion vector, a reference picture, a flag tu_y_coded_flag indicating whether there is a non-zero coefficient in a transform block, tu_u_coded_flag, and the like. edgeIdc and bS may take values of 0, 1, and 2, or may be other values.

The bS derivation unit 602 derives maxFilterLength to be used for the length of the deblocking filter, depending on a transform block size. The bS derivation unit 602 derives an edge determination parameter dE to be used for switching of the deblocking filter.

Figure 11:
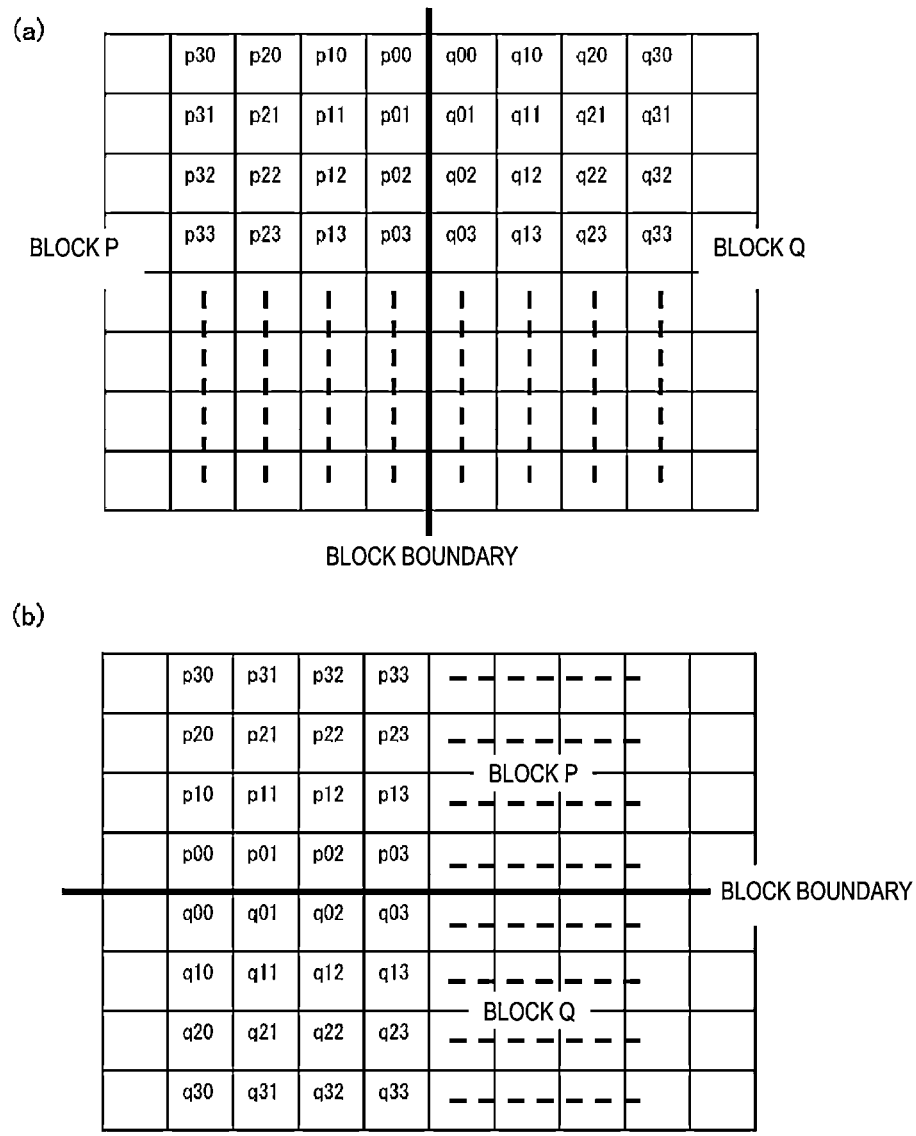
FIG. 11 is a diagram illustrating a deblocking filter.

FIG. 11 is a diagram illustrating an example of the deblocking filter. In a case that a difference of pixel values of pixels adjoining across a block (CTU/CU/TU) boundary is within a predetermined range, the deblocking filter determines that there is block distortion. By performing deblocking processing on the block boundary in an input image, an image around the block boundary is smoothed. The image subjected to the deblocking processing using the deblocking filter is dfSamples.

In a case that the value of dE is other than 0 and is other than 3, the DF filter unit 603 performs the following processing as a short tap filter. Determination of ON and OFF of the deblocking filter is performed according to the following expression.

$$\text{abs}(p20 - 2*p10 + p00) + \text{abs}(p23 - 2*p13 + p03) + \quad \text{(Expression DB-1)}$$
$$\text{abs}(q20 - 2*q10 + q00) + \text{abs}(q23 - 2*q13 + q03) < \beta$$

Here, p2k, p1k, p0k, q0k, q1k, and q2k are a column or a row of pixels whose distance from the block boundary is 2, 1, 0, 0, 1, and 2, respectively. p2k, p1k, and p0k are pixels included in a block P out of the block P and a block Q adjacent to each other across the boundary, and q0k, q1k, and q2k are pixels included in the block Q. k indicates a number of the pixel in a block boundary direction, and k>=0. β is a threshold derived from an average value QPavg of the quantization parameters of the block P and the block Q and pps_beta_offset_div2 and slice_beta_offset_div2 signaled by a PPS or a slice header SH. In a case that (Expression DB-1) is satisfied, the deblocking filter is turned on (performed) for the boundary of the block P and the block Q. The deblocking filter processing is performed according to the following expression.

$$p2' = Clip3(p2 - 2*tc, p2 + 2*tc, \quad \text{(Expression DB-2)}$$
$$(2*p3 + 3*p2 + p1 + p0 + q0 + 4) >> 3$$
$$p1' = Clip3(p1 - 2*tc, p1 + 2*tc, (p2 + p1 + p0 + q0 + 2) >> 2)$$
$$p0' =$$
$$Clip3(p0 - 2*tc, p0 + 2*tc, (p2 + 2*p1 + 2*p0 + 2*q0 + q1 + 4) >> 3)$$
$$q0' =$$
$$Clip3(q0 - 2*tc, q0 + 2*tc, (p1 + 2*p0 + 2*q0 + 2*q1 + q2 + 4) >> 3)$$
$$q1' = Clip3(q1 - 2*tc, q1 + 2*tc, (p0 + q0 + q1 + q2 + 2) >> 2)$$
$$q2' = Clip3(q2 - 2*tc, q2 + 2*tc, (p0 + q0 + q1 + 3*q2 + 2*q3 + 4) >> 3$$

(Expression DB-2) is common processing for each k (k>=0) in FIG. 11, and thus k is omitted. p3, p2, p1, p0, q0, q1, q2, and q3 are a column or a row of pixels whose distance from the block boundary is 3, 2, 1, 0, 0, 1, 2, and 3, respectively. tc is a variable for reducing the filter processing, and is a threshold derived from the average value QPavg of the quantization parameters of the block P and the block Q, pps_tc_offset_div2 and slice_tc_offset_div2 signaled by a PPS or a slice header SH, and the like.

In a case that the value of dE is 3, the DF filter unit 603 derives pixel values refP and refQ dependent upon a middle pixel value refMiddle and maxFilterLength as a long tap filter.

$$refMiddle =$$
$$(p4 + p3 + 2*(p2 + p1 + p0 + q0 + q0 + q2) + q3 + q4 + 8) >> 4$$
$$refP = (p\text{max}FilterLengthP + q\text{max}FilterLengthP - 1) >> 1$$
$$refQ = (q\text{max}FilterLengthQ + p\text{max}FilterLengthQ - 1) >> 1$$

The DF filter unit 603 derives a filtered pixel value, using a target pixel pi, refMiddle, and refP(qi, refMiddle, refQ).

$$pi' = Clip3(pi - (tC*tCPDi >> 1),$$
$$pi + (tC*tCPDi >> 1), (refMiddle*fi + refP*(64 - fi) + 32) >> 6)$$
$$qj' = Clip3(qj - (tC*tCQDj >> 1),$$
$$qj + (tC*tCQDj >> 1), (refMiddle*gj + refQ*(64 - gj) + 32) >> 6)$$

Here, tCPDi and tCQDj are prescribed values determined based on maxFilerLengthP and maxFilterLengthQ, respectively.

Figure 12:
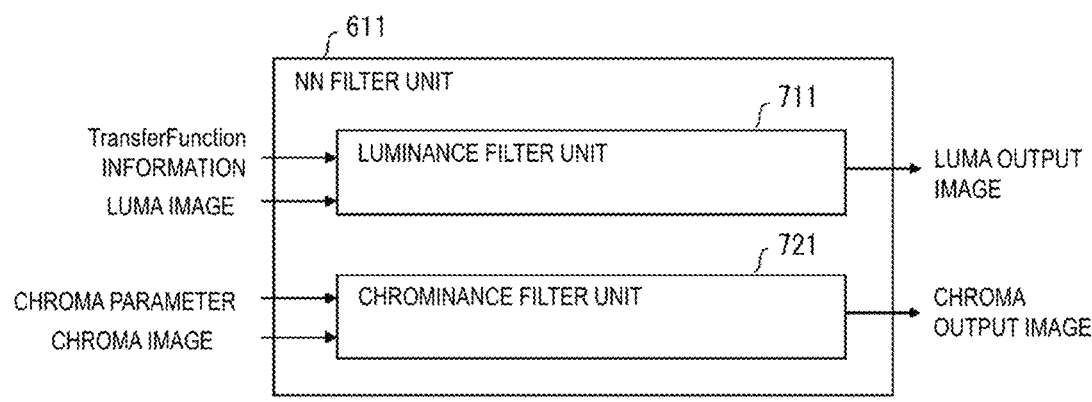
FIG. 12 is a diagram illustrating luminance and chrominance NN filters using TransferFunction information and a chroma parameter.

Switching of Luminance and Chrominance NN Filters Using TransferFuntion Information and Chroma Parameter FIG. 12 is a diagram illustrating the luminance and chrominance NN filters using TransferFuntion information and a chroma parameter. The NN filter unit 611 includes a luminance filter unit 711 and a chrominance filter unit 721, receives TransferFunction information, a chroma parameter, a luma image, and a chroma image, and respectively outputs luma image and a chroma image subjected to NN filter processing.

The luminance filter unit 711 at least inputs a luma image and outputs the luma image. The chrominance filter unit 721 at least inputs a chroma image and outputs the chroma image. The chroma image may simultaneously input two images of Cb and Cr, and simultaneously output the two images. The luma image may be input to the chrominance filter unit 721. The coding parameters, such as a QP value and a bS value, may be input to the luminance filter unit 711 and the chrominance filter unit 721.

The TransferFunction information indicates a relationship between a luminance signal decoded in the image decoding apparatus and a luminance value used in display in the display device, or a relationship between a luminance value of a capture image and a luminance signal coded in the image coding apparatus. The former may be referred to as an electronic-opto transfer function (EOTF) and the latter may be referred to as an opto-electronic transfer function (OETF), but these are not distinguished here. Note that the transfer function can distinguish whether it is SDR or HDR, and can distinguish a type of an HDR signal. Note that, in the present embodiment, the TransferFunction information has values of three or more values. The values may include values corresponding to SDR, PQ, and HLG. Chroma parameter information is a value indicating which color space is used by luminance (Y) and chrominance (Cb, Cr), and has values of two or more values, and the values may include values corresponding to ITU-R BT.2020 (ITU-R BT.2100) and ITU-R BT.709. Although switching of the NN filters is performed depending on the transfer function and the chroma parameter, switching of the chrominance NN filter using the TransferFunction information is not performed and switching of the luminance NN filter using the chroma parameter is not performed.

Figure 13:
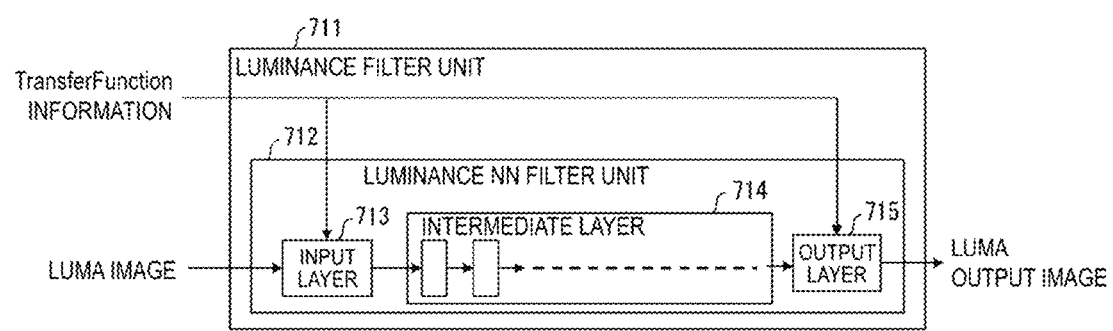
FIG. 13 is a diagram illustrating a luminance filter unit using the TransferFunction information.

FIG. 13 is a diagram illustrating the luminance filter unit using the TransferFuntion information. The luminance filter unit 711 includes a luminance NN filter unit 712, receives TransferFuntion information and a luma image, and generates a luma output image. The luminance NN filter unit 712 includes an input layer 713, an intermediate layer 714, and an output layer 715. The input layer 713 receives the luma image and the TransferFunction information, maps the luma image to a common luminance space based on the Transferfunction information, and delivers the resultant to the intermediate layer 714. The output layer 715 also receives the output from the intermediate layer 714 and the TransferFunction information, maps the output from the intermediate layer 714 to the luminance space indicated by the TransferFunction information, and generates a luma output image. By inputting the TransferFunction information to the input layer 713 and the output layer 715, there is an effect of enabling to make an internal intermediate network to be common and perform similar processing regardless of the transfer function. The input layer 713 that inputs the TransferFunction information may include a sum of products between channels only, addition of a bias term, and Activation, without having spatial extension referred to as 1×1 Conv. A layer of 1×1 Conv is not limited to one layer, and multiple superimposed layers of 1×1 Conv may be used as the input layer 713.

The amount of calculation of Conv processing is k*k*m*n, where the number of channels of input is represented by m, the number of channels of output is represented by n, and the kernel size is represented by k. The output layer 713 that inputs the TransferFunction information may also be 1×1 Conv described above. The amount of calculation of 1×1 Conv is 1*1*m*n, and the amount of calculation is ⅑ as compared to 3×3 Conv where k=3. According to the configuration described above, such an effect can be achieved that preferable processing is performed on an image of multiple pieces of TransferFunction information with a reduced amount of processing because a spatial kernel such as 3×3 is not used.

The neural network may repeatedly apply the following processing.

In Conv, as shown in the following expression, the input image (luma image) inSamples is subjected to convolution operation using a kernel k[mm][i][j], and an output image (luma output image) outSamples to which bias is added is derived. Here, nn=0 . . . n−1, xx=0 . . . width−1, and yy=0 . . . height−1.

$outSamples[nn][xx][yy] =$ $\Sigma\Sigma\Sigma(k[mm][i][j] * inSamples[mm][xx + i - of][yy + j - of] + \text{bias}[nn])$ In a case of 1×1 Conv, Σ represents the sum for each of mm=0 . . . m−1, i=0, and j=0. In this case, of =0 is set. In a case of 3×3 Conv, Σ represents the sum for each of mm=0 . . . m−1, i=0 . . . 2, and j=0 . . . 2. In this case, of =1 is set. n represents the number of channels of outSamples, m represents the number of channels of inSamples, width represents the width of inSamples and outSamples, and height represents the height of inSamples and outSamples. of represents the size of padding provided around inSamples.

Processing shown by the following expression referred to as Depth wise Conv may be performed. Here, nn=0 . . . n−1, xx=0 . . . width−1, and yy=0 . . . height−1.

$outSamples[nn][xx][yy] =$ $\Sigma\Sigma(k[nn][i][j] * inSamples[nn][xx + i - of][yy + j - of] + \text{bias}[nn])$ Σ represents the sum for each of i and j. n represents the number of channels of outSamples and inSamples, width represents the width of inSamples and outSamples, and height represents the height of inSamples and outSamples.

Non-linear processing referred to as Activate, such as ReLU, may be used.

$ReLU(x) = x > = 0?x:0$ leakyReLU shown in the following expression may be used.

$leakyReLU(x) = x > = 0?x:a*x$

Here, a is a prescribed value, for example, 0.1 or 0.125. In order to perform integer arithmetic, all of the above values of k (or i, j), bias, and a may be integers, and right shifting may be performed after Conv.

In ReLU, for values less than 0, 0 is invariably output, and for values equal to or greater than 0, an input value is directly output. In contrast, in leakyReLU, for values less than 0, linear processing is performed with a gradient being set equal to a. In ReLU, the gradient for values less than 0 disappears, and learning may not advance steadily. In leakyReLU, by maintaining the gradient for values less than 0, the above problem is less easily caused. Of above leakyReLU(x), PRELU using a parameterized value of a may be used.

Figure 14:
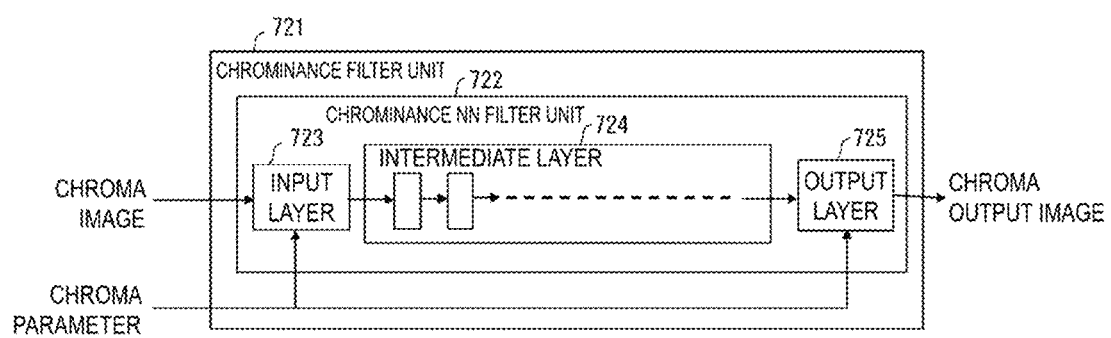
FIG. 14 is a diagram illustrating a chrominance filter unit using the chroma parameter.

FIG. 14 is a diagram illustrating the chrominance filter unit using the chroma parameter.

The chrominance filter unit 721 includes a chrominance NN filter unit 722, receives a chroma parameter and a chroma image, and generates a chroma output image. The chrominance NN filter unit 722 includes an input layer 723, an intermediate layer 724, and an output layer 725. The input layer 723 receives the chroma image and the chroma parameter, maps the chroma image to a common color space based on the chroma parameter, and delivers the resultant to the intermediate layer 724. The output layer 725 receives the output from the intermediate layer 724 and the chroma parameter, maps the output from the intermediate layer 724 to the color space indicated by the chroma parameter, and generates a chroma output image. This enables to make an internal network to be common and perform similar processing regardless of the color space. The input layer 723 that inputs the chroma parameter may be a sum of products between channels only, addition of a bias term, and Activation, without having spatial extension referred to as 1×1 Conv. The output layer 725 that inputs the chroma parameter may also be 1×1 Conv described above. According to the configuration described above, such an effect can be achieved that preferable processing can be performed on an image of multiple chroma parameters with a reduced amount of processing because a spatial kernel such as 3×3 is not used.

Application Examples

The video coding apparatus 10 and the video decoding apparatus 30 described above can be utilized being installed to various apparatuses performing transmission, reception, recording, and reconstruction of videos. Note that the video may be a natural video imaged by a camera or the like, or may be an artificial video (including CG and GUI) generated by a computer or the like.

The embodiment of the present invention is not limited to the above-described embodiment, and various modifications are possible within the scope of the claims. That is, an embodiment obtained by combining technical means modified appropriately within the scope of the claims is also included in the technical scope of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

The invention claimed is:

1. A video decoding apparatus including a parameter decoder for decoding a filter parameter from coded data, a bS derivation unit for deriving deblocking filter strength bS, a DF unit for applying a deblocking filter to a decoded image, an NN filter unit for applying filter processing to the decoded image using a neural network, and an image combining unit, wherein
    the parameter decoder decodes a parameter indicating a degree of application of an NN filter in a unit of a prescribed block,
    the parameter is a parameter set to three or more values,
    the NN filter unit outputs a first image from the decoded image,
    the DF unit outputs a second image from the decoded image,
    the image combining unit derives an output image from the first image, the second image, and the parameter, and
    the output image is derived by using a weighted average of the first image and the second image.

2. A video decoding apparatus including a parameter decoder for decoding a filter parameter from coded data, a bS derivation unit for deriving deblocking filter strength bS, a DF unit for applying a deblocking filter to a decoded image, an NN filter unit for applying filter processing to the decoded image using a neural network, and an image combining unit, wherein
    the parameter decoder decodes a parameter indicating a degree of application of an NN filter in a unit of a prescribed block,
    the parameter is a binary flag,
    the NN filter unit outputs a first image from the decoded image,
    the DF unit outputs a second image from the decoded image,
    the image combining unit derives an output image from the first image, the second image, and the parameter, and
    the output image is derived by using the first image in a case that a value of the binary flag is equal to a first value and by using the second image in a case that the value of the binary flag is equal to a second value.

3. A video coding apparatus including a parameter coder for creating a filter parameter, a bS derivation unit for deriving deblocking filter strength bS, a DF unit for performing a deblocking filter, an NN filter unit for performing filter processing using a neural network, and an image combining unit, wherein
    the parameter coder creates a parameter indicating a degree of application of an NN filter in a unit of a prescribed block,
    the parameter is a parameter set to three or more values,
    the NN filter unit outputs a first image from the decoded image,
    the DF unit outputs a second image from the decoded image, and
    the image combining unit derives a third image from the first image, the second image, and the parameter, and
    the third image is derived using a weighted average of the first image and the second image.

* * * * *